Dec. 13, 1938.   J. A. DERRIG   2,139,733
COLLET CHUCK
Filed Oct. 10, 1936
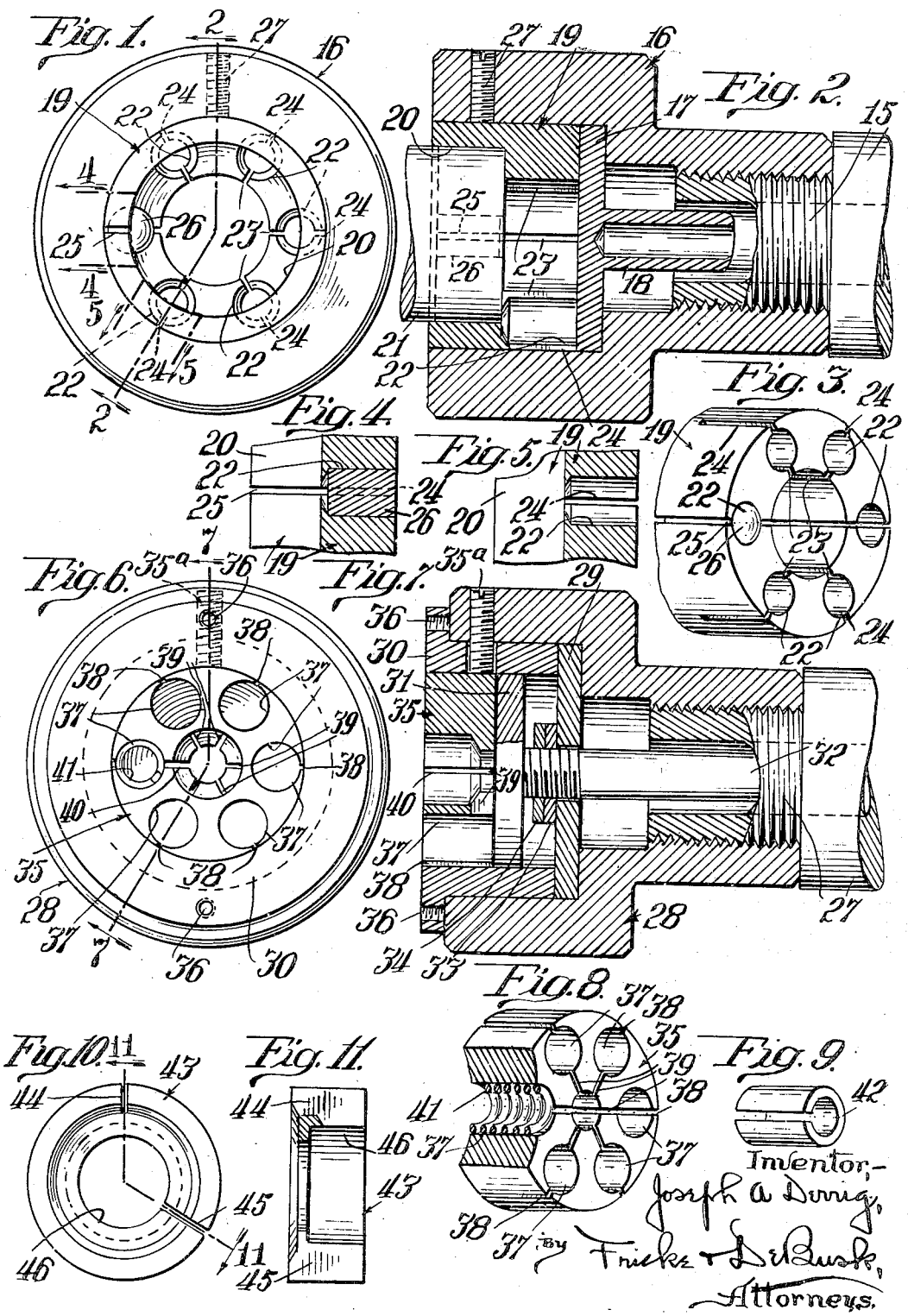

Patented Dec. 13, 1938

2,139,733

UNITED STATES PATENT OFFICE 2,139,733

COLLET CHUCK

Joseph A. Derrig, Chicago, Ill.

Application October 10, 1936, Serial No. 104,960

6 Claims. (Cl. 279—46)

My invention relates to collet chucks for use on lathes or other machine tools, and it has for its object the provision of a new and improved form and arrangement of parts in a device of this type whereby a series of similar work-pieces can be very quickly and easily inserted successively into operative gripped position in the machine and as quickly and easily removed so as to enable a workman to accomplish the required amount of work on a maximum number of pieces within a given period. As will be readily understood, this is of extreme importance in connection with a series of parts which must be locked up in centered position for a very small amount of work on each piece, the amount of work accomplished depending largely upon the rapidity with which the parts can be inserted into the machine and removed therefrom.

It is one of the objects of my invention to provide an improved arrangement of parts in a device of this type in the use of which the act of locking the collet in the chuck serves also to lock the work-piece in centered position in the collet. To this end, it is one of the objects of my invention to provide an improved form of collet, comprising means for spreading the collet very slightly out of concentric conformation for the insertion of a work-piece therein when the collet is out of position in the chuck or is loosely mounted in the chuck, and arranged so that when the collet is clamped into its operative position in the chuck it is returned to its normal concentric form, in which concentric form the collet has an effective grip on the work-piece.

It is another object of my invention to provide an arrangement of this type comprising improved means for removing the collet from the chuck member, and to provide auxiliary cooperating means comprising a bushing for use when smaller work-pieces are to be machined. It is one of my objects to provide an improved arrangement comprising such a bushing together with adjustable stop means for limiting the movement of the collet into the bushing.

It is another object of my invention to improve devices of this type in sundry details hereinafter pointed out, with respect to the removal of the collet from the chuck, with respect to an adjustment of the parts for use with collets of different sizes, with respect to the form of the spreader means employed in connection with the collet, and with respect to other features as hereinafter set forth. The preferred means by which I have accomplished my several objects are illustrated in the drawing and are hereinafter specifically described. That which I believe to be new and desire to cover by Letters Patent is set forth in the claims.

In the drawing,—

Fig. 1 is a face view of a chuck of the ordinary type with one of my improved collets mounted therein;

Fig. 2 is a vertical cross sectional view taken at line 2—2 of Fig. 1 and showing also a work-piece in position in the collet;

Fig. 3 is a perspective view of the collet shown in Figs. 1 and 2 but with the outer face end portion broken away;

Figs. 4 and 5 are detailed views, being sections taken respectively at line 4—4 and line 5—5 of Fig. 1;

Fig. 6 is a face view of a chuck having a bushing mounted therein with a modified form of collet mounted in the bushing;

Fig. 7 is a vertical cross sectional view taken at line 7—7 of Fig. 6;

Fig. 8 is a perspective view of the collet shown in Fig. 6 but partially broken away at one side;

Fig. 9 is a perspective view of a modified form of spreader adapted for use in connection with the collet of Fig. 8;

Fig. 10 is a face view of a third form of collet adapted for use in the chuck and bushing of Fig. 7; and Fig. 11 is a vertical cross sectional view taken at line 11—11 of Fig. 10.

Referring now to Figs. 1 to 5, inclusive, of the drawing, in which corresponding parts are indicated by the same reference characters, 15 indicates the hollow driving spindle of a lathe or other power machine tool, having a chuck member 16 mounted by meeans of screw threads thereon. Within the socket of the chuck member 16, I have mounted a plate 17 in transverse position, such plate 17 being provided with a shank 18 projecting backwardly therefrom through the rear face of the chuck member 16 and through the hollow spindle 15. Within said socket in front of said plate 17 I have mounted an improved collet member 19 embodying some of the features of my invention, such collet 19 being in the form of a ring which is cut out at one face to provide a socket 20 which in the arrangement shown is circular for the reception of a circular work-piece 21. As is best shown in Fig. 3, the opposite face portion of the collet 19 is provided with a plurality of openings 22 in spaced relation to each other about the ring, the metal of the ring being cut through opposite said openings 22 at both the inside faces and the outside faces of the openings, as indicated at 23 and 24, and being cut radially entirely through the ring at the opening 22 at the extreme left in Fig. 1, as indicated at 25. As will be readily understood, by the provision of the radially positioned cuts, as above described, the cooperating portions of the collet between the cuts are made movable toward or away from the axis of the collet, the ring being thus made yielding so as to be capable of being compressed and expanded readily for changing slightly the effective size of the socket 20.

In the arrangement shown in Fig. 1, I have mounted a metal plug 26 in the opening 22 closest adjacent to the point at which the ring is split completely at 25, such plug being of such a critical effective size normally as to spread the ring 19 very slightly out of its normal concentric shape when the plug is inserted into said opening 22, the socket 20 being made of such size as to permit the collet to remain in its slightly spread condition when inserted into the socket. By reason of this arrangement, I am enabled to insert a work-piece readily into the socket 20 of the collet while the collet is in position in the chuck member, and to remove the work-piece in due time from the collet while the collet is still in position in the chuck member. For locking the collet in position in the chuck member, I have provided a set screw 27 mounted by means of screw threads in radial position in the wall of the chuck member 19. The arrangement is such that when the set screw is moved inwardly the ring 19 is compressed into tight gripping engagement with the work-piece 21 and the ring 19 is pressed as a whole into gripping engagement with the wall of the chuck member 16. Such compression of the collet with the spreader plug 26 still in position in the opening 22 is very small, being limited to a tightening effect between the plug 26 and the oppositely disposed notches provided by the opening 22 in the faces of the metal at the point of the cut 25, but I have found that such tightening effect is sufficient for permitting the collet to be brought into effective gripping engagement with the work-piece. When the collet 19 is to be removed from the chuck member, this can be effected readily by pressure applied on the plate 17 through the medium of the shank 18 at the point where said shank projects backwardly beyond the end of the spindle 15.

By the use of this arrangement, comprising a spreader member adapted automatically to open the collet within the chuck member sufficiently for the insertion of the work-piece for which the collet is designed, and comprising means for compressing the collet into clamping engagement with the work-piece and serving by the clamping operation to secure the collet also against removal from the chuck, I have been enabled to speed up very materially the action of the machine tool on which the arrangement is employed, the insertion and removal of the work-pieces successively taking a minimum of time. With the parts arranged so that the spreader opens the collet slightly beyond its normal concentric form and so that the clamping merely returns the collet to its normal concentric form, I am insured that the work-pieces will be in all cases in accurately centered position in the chuck member, which is, of course, necessary for first-class work.

In Figs. 6, 7 and 8, the arrangement is very similar, comprising a spindle 27 and a chuck member 28, as above described. Within the chuck member 28, I have provided a cross-plate 29 against the face of which I insert a bushing 30. Within the bushing 30, in turn, I have provided a second cross-plate 31, such plate 31 being provided with a shank 32 extending backwardly through an opening in the plate 29 and through the hollow spindle 27. In the arrangement shown, an adjusting nut 33 and a lock-nut 34 are mounted by means of screw threads on the shank 32 so as to hold the plate 31 in adjusted position within the socket of said bushing 30 for holding the collet 35 in the desired position in said socket. In the arrangement here shown, a set screw 35a is employed, mounted by means of screw threads in the wall of the chuck member 28 and passing loosely through an opening in the wall of the bushing so as to have access to the outer face of the collet 35 for compressing the collet in the manner described above in connection with the arrangement of Fig. 1. The collet 35 will be removed from the socket through the medium of the plate 31 and the shank 32, and the bushing 30 will be removed from the chuck member by pressure on the rear face of the plate 29 or by means of suitable screws threaded into openings 36 in the front face of the bushing.

The collet 35 is of slightly different form from that of the collet 19. In the collet 35, the openings 37 extend through the collet from one face to the other, the metal of the collet being cut through at the outer face of each of said openings at 38 but being cut only part way through at the inner faces of said openings at 39, as is best shown in Fig. 7, except for a single one of said openings 37 at which the metal is cut through also at the inner face of the opening at 40 from one face of the collet to the other face, as is best shown in Fig. 6. By this arrangement, this collet also is given the form of a split ring so as to make it capable of being spread readily by a coiled spring 41 in the opening 37 at which the ring is cut completely across and capable of being readily compressed by the movement of the set screw 35a inwardly.

In Fig. 9, I have shown a cylindrical form of spring 42 adapted to be used in the opening 37 in lieu of the coiled spring spreader 41, if desired.

In Figs. 10 and 11, I have illustrated a modified form of collet 43 comprising a metal ring having a single cut at 44 part way through the ring and a cut at 45 entirely through the ring so as to provide a compressible socket 46. In the use of the collet 43 the resiliency of the metal of the collet itself is depended upon for the desired spreading effect, the compression of the collet being effected in the same manner as is above described in connection with the collet 35.

While I prefer to employ the form and arrangement of the parts as shown in the drawing and as above described, it is to be understood that my invention is not limited thereto except so far as it is so limited by the claims, it being understood that changes might well be made in the form and arrangement of the parts without departing from my invention.

I claim:—

1. In a device of the type described, the combination of a rigid chuck member, a bushing removably mounted in said chuck member, a compressible collet mounted in said bushing and comprising means for holding the collet in slightly spread condition for receiving a work-piece into operative position therein, means for giving said collet a closing movement into gripping engagement with said work-piece for holding the work-piece in centered position with respect to said chuck member and serving also to hold the bushing and the collet in position in the chuck member, and adjustable means for limiting the movement of the collet into said bushing, comprising a plate transversely positioned in the chuck member, and a second plate transversely positioned in the bushing adjacent to the collet and adjustable toward and from said first named plate.

2. In a device of the type described, the combination of a hollow spindle, a rigid chuck member removably mounted on said spindle, a plate removably mounted in said chuck member transversely thereof, a bushing removably mounted in said chuck member in front of said plate, a second plate removably mounted in said bushing, a shank carried by said second plate and extending backwardly through an opening in said first-named plate and through said hollow spindle, a nut mounted by means of screw threads on said shank between said two plates for limiting the movement of the second plate inwardly toward the first-named plate, a compressible collet removably mounted in said bushing in front of said second plate and having means for holding the collet in slightly spread condition for receiving a work-piece into operative position therein, and means for giving said collet a closing movement into gripping engagement with said work-piece for holding the work-piece in centered position with respect to said chuck member and serving also to hold the bushing and the collet in position in the chuck member.

3. A collet in the form of a disc of metal having a socket in centered position in one face and having a plurality of openings in its opposite face in spaced relation to each other, the metal being cut completely through in radial direction at both the inside faces and the outside faces of said openings adjacent to said opposite face of the collet and being cut completely through at said one face also at one of said openings so as to give the collet the form of a split ring.

4. In a device of the type described, the combination of a collet in the form of a disc of metal having a socket in centered position in one face and having a plurality of openings in its opposite face in spaced relation to each other, the metal being cut completely through in radial direction at both the inside faces and the outside faces of said openings adjacent to said opposite face of the collet and being cut completely through at said one face also at one of said openings so as to give the collet the form of a split ring, and a spreader member in said one opening serving normally to hold said collet in slightly spread condition for receiving a work-piece into operative position in said socket.

5. In a device of the type described, the combination of a collet in the form of a ring cut completely across at one side so as to provide a compressible socket for a work piece, a rigid chuck member into which said collet is readily insertable, a spreader member of a critical effective size with respect to the size of the cooperating parts adapted normally when inserted between the cut ends of said ring to spread the ring to a slight extent only so as to increase the effective size of the opening through the ring for receiving the designed work piece readily thereinto but so as to permit the collet in such spread condition to move readily into and out of position in the chuck, and means for locking said collet in position in said chuck member serving by the operation of locking the collet in place to compress the collet against the action of said spreader means for holding the designed work piece rigidly in centered position in the collet.

6. In a device of the type described, the combination of a collet in the form of a ring cut across at one side so as to provide a compressible socket for a work piece and having oppositely disposed notches in the face portions at the cut, a rigid chuck member into which said collet is readily insertable, a spreader member of substantially cylindrical form in outline of such critical effective size with respect to the size of the cooperating parts that it is adapted normally to be inserted into said notches to spread the ring to a slight extent only so as to increase the effective size of the opening through the ring for receiving the designed work piece readily thereinto but so as to permit the collet in such spread condition to move readily into and out of position in the chuck, and means for locking said collet in position in said chuck member serving by the operation of locking the collet in place to compress the collet against the action of said spreader means for holding the designed work piece rigidly in centered position in the collet.

JOSEPH A. DERRIG.